US009497177B2

(12) United States Patent
Fujiki et al.

(10) Patent No.: US 9,497,177 B2
(45) Date of Patent: *Nov. 15, 2016

(54) COMMUNICATIONS RELAY APPARATUS

(71) Applicant: DENSO CORPORATION, Kariya, Aichi-pref. (JP)

(72) Inventors: Kouji Fujiki, Kariya (JP); Tomohisa Kishigami, Obu (JP); Yoshinori Takai, Obu (JP); Yasumasa Imai, Toyota (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 321 days.

This patent is subject to a terminal disclaimer.

(21) Appl. No.: 13/740,512

(22) Filed: Jan. 14, 2013

(65) Prior Publication Data

US 2013/0185766 A1    Jul. 18, 2013

(30) Foreign Application Priority Data

Jan. 17, 2012 (JP) .................................. 2012-007195

(51) Int. Cl.
*H04L 29/06* (2006.01)
*H04L 12/40* (2006.01)
*H04L 12/46* (2006.01)

(52) U.S. Cl.
CPC ......... *H04L 63/08* (2013.01); *H04L 12/40006* (2013.01); *H04L 12/4625* (2013.01); *H04L 2012/40273* (2013.01)

(58) Field of Classification Search
None
See application file for complete search history.

(56) References Cited

U.S. PATENT DOCUMENTS 5,670,933 A    9/1997 Hayashi
8,978,109 B2 *  3/2015 Hirashima .......... H04L 63/0853
                                                    340/426.13

(Continued)

FOREIGN PATENT DOCUMENTS

JP    08-030873    2/1996
JP    10-222363    8/1998

(Continued)

OTHER PUBLICATIONS

Office action dated Jul. 29, 2014 in corresponding Japanese Application No. 2012-007195.

(Continued)

*Primary Examiner* — Farid Homayounmehr
*Assistant Examiner* — Olanrewaju Bucknor
(74) *Attorney, Agent, or Firm* — Harness, Dickey & Pierce, P.L.C.

(57) ABSTRACT

A communications relay apparatus for relaying communications between an electronic control unit (ECU) connected to the apparatus via an in-vehicle local area network (LAN) and an external device connected to the apparatus via a communication path different from the in-vehicle LAN. In the apparatus, a data transfer unit forwards relay data received from the ECU to the communication path and forwards relay data received from the external device to the in-vehicle LAN. But the data transfer unit is inhibited from forwarding reprogramming data for reprogramming the ECU received from the external device to the in-vehicle LAN. An authentication unit authenticates a vehicle user, and when the vehicle user is successfully authenticated, then permits the data transfer unit to forward the reprogramming data to the in-vehicle LAN.

15 Claims, 6 Drawing Sheets

(56) References Cited

U.S. PATENT DOCUMENTS

| | | | |
|---|---|---|---|
| 2003/0009271 A1 | 1/2003 | Akiyama | |
| 2005/0271037 A1* | 12/2005 | Habaguchi et al. | 370/351 |
| 2007/0036021 A1* | 2/2007 | Nakagaki | G11C 16/10 |
| | | | 365/230.03 |
| 2007/0227489 A1* | 10/2007 | Ando | B60R 25/04 |
| | | | 123/179.3 |
| 2008/0174447 A1 | 7/2008 | Ohno | |
| 2010/0002710 A1* | 1/2010 | Isoyama | H04L 12/66 |
| | | | 370/401 |
| 2010/0124196 A1* | 5/2010 | Bonar et al. | 370/329 |
| 2010/0302956 A1* | 12/2010 | Haverty | 370/252 |
| 2013/0169408 A1* | 7/2013 | Endo | 340/5.6 |
| 2014/0196114 A1* | 7/2014 | Hirashima et al. | 726/4 |
| 2014/0347163 A1* | 11/2014 | Banter et al. | 340/5.72 |

FOREIGN PATENT DOCUMENTS

| | | |
|---|---|---|
| JP | 2003-046536 | 2/2003 |
| JP | 2006-295345 | 10/2006 |
| JP | 2008-042830 | 2/2008 |
| JP | 2010-258990 | 11/2010 |

OTHER PUBLICATIONS

Office action dated Apr. 15, 2014 in corresponding Japanese Application No. 2012-007195.

Office action dated Nov. 26, 2013 in corresponding Japanese Application No. 2012-007195.

\* cited by examiner

COMMUNICATIONS RELAY APPARATUS

CROSS-REFERENCE TO RELATED APPLICATION

This application is based on and claims the benefit of priority from earlier Japanese Patent Application No. 2012-7195 filed Jan. 17, 2012, the description of which is incorporated herein by reference.

BACKGROUND

1. Technical Field

The present invention relates to a communications: relay apparatus for relaying communications between an electronic control unit (ECU) connected to the apparatus via an in-vehicle local area network (LAN) and an external device connected to the apparatus via a communication path different from the in-vehicle LAN.

2. Related Art

An immobilizer, as disclosed in Japanese Patent Application Laid-Open Publication No. H08-30873, is a vehicle-mounted anti-theft system, which authenticates a vehicle user with an encrypted code received from a user's key and allows an engine to start only when the user is successfully authenticated. Use of the immobilizer can prevent vehicle theft, for example, even when a vehicle's door is forcibly opened.

An ECU serving as the immobilizer (referred herein to as an immobilizer ECU) is connected to an in-vehicle LAN, such as a controller area network (CAN) or the like. In recent years, an increasing number of vehicles provided with a dedicated port for connecting an external tool to the in-vehicle LAN are circulating. In each of them, the external tool communicates with the immobilizer ECU via such a dedicated port to test the immobilizer ECU or to reprogram the immobilizer ECU for correcting a flaw therein or for version upgrade.

In recent years, however, a devious tool (known as an "immobilizer cutter") capable of deactivating the anti-theft function of the immobilizer in a short time has been in circulation. The devious tool can be connected to the in-vehicle LAN via the dedicated port to access the immobilizer ECU and can deactivate the anti-theft function by reprogramming the immobilizer ECU.

As above, the reprogramming of the immobilizer ECU via the in-vehicle LAN may be misused for vehicle theft. In addition, the immobilizer ECU may be tampered with in a similar manner.

In consideration of the foregoing, it would therefore be desirable to have a communications relay apparatus capable of preventing unauthorized reprogramming of an ECU.

SUMMARY

In accordance with an exemplary embodiment of the present invention, there is provided a communications relay apparatus for relaying communications between an electronic control unit (ECU) connected to the apparatus via an in-vehicle local area network (LAN) and an external device connected to the apparatus via a communication path different from the in-vehicle LAN.

The apparatus includes: a data transfer unit that forwards relay data received from the ECU to the communication path and forwards relay data received from the external device to the in-vehicle LAN, and is inhibited from forwarding reprogramming data for reprogramming the ECU received from the external device to the in-vehicle LAN; and an authentication unit that authenticates a vehicle user, and when the vehicle user is successfully authenticated, then permits the data transfer unit to forward the reprogramming data to the in-vehicle LAN.

In the above embodiment, the reprogramming data is permitted to be transferred from the external device to the ECU when the vehicle user is successfully authenticated, while relay of the reprogramming data from the external device to the ECU is initially inhibited. This can prevent a third party from fraudulently reprogramming the ECU and thereby reliably prevent vehicle theft.

According to one embodiment, the apparatus further includes a detection unit that detects a sequence of operations performed on a predetermined set of operation units of a vehicle. The authentication unit determines whether or not the detected sequence of operations are consistent with a predetermined authentication procedure from detections of the detection unit, and when it is determined that the detected sequence of operations are consistent with the predetermined authentication procedure, then the vehicle user is successfully authenticated.

With this configuration, when it is determined that the detected sequence of operations performed on the predetermined set of operation units are consistent with the predetermined authentication procedure (the vehicle user is thereby successfully authenticated), the reprogramming data is permitted to be transferred from the external device to the ECU.

The predetermined set of operation units of the vehicle may be selected from a group of outer and inner door handles of respective doors of the vehicle, a door-window opening/closing switch, a steering wheel, an accelerator pedal, a brake pedal, an operational button for vehicle equipment (such as a car air-conditioner, a navigation device or the like), a touch-sensitive switch for detecting a user's hand has touched a door handle, which is used to unlock a door of a vehicle equipped with a smart entry system, and a door lock switch used to unlock a vehicle door without a key.

As an example, the authentication procedure may be given by the following sequence of operations including: a driver operating an outer door-handle for a driver seat once, the driver operating a door lock switch near the driver seat twice, and then the driver or another passenger operating an outer door-handle for a front passenger seat once. In this example, the predetermined set of operation units include the outer door-handle for the driver seat, the outer door-handle for the front passenger seat, and the door lock switch near the driver seat. Alternatively, the authentication procedure may be given by a sequence of operations performed on a door-window opening/closing switch, a steering wheel, a specific operational button for a car air-conditioner and other operation units.

With this configuration, only when a sequence of operations performed on the predetermined set of operation units of the vehicle are consistent with the predetermined authentication procedure, the external device (e.g., an external tool) is allowed to reprogram the ECU. This can prevent a third party without knowledge of the authentication procedure from fraudulently reprogramming the ECU.

In addition, a third party who doesn't know the above authentication procedure is unable to reprogram the ECU of the immobilizer even by using the above described devious tool ("immobilizer cutter"). This can prevent the immobilizer from being deactivated and thus reliably prevent the vehicle theft.

According to one embodiment, the data transfer unit is adapted to forward only pre-registered relay data received from the external device to the in-vehicle LAN, regardless of whether or not the vehicle user is successfully authenticated. The reprogramming data is included in the pre-registered relay data. The pre-registered relay data other than the reprogramming data is referred to as basic relay data. The data transfer unit is thus only allowed to forward the basic relay data received from the external device to the in-vehicle LAN unless the vehicle user is successfully authenticated.

This allows the external device to perform various processes other than reprogramming of the ECU, such as ECU testing.

According to one embodiment, the detection unit detects the sequence of operations performed on the predetermined set of operation units on the basis of data received from the ECU via the in-vehicle LAN.

This makes it possible to detect a wide variety of operations to be performed on the operation units, which leads to a greater variation in sequence of operations to be performed on the operation units that can be used as the authentication procedure. This can more reliably prevent the authentication procedure from being compromised by a third party.

According to one embodiment, the communication path may be a wired communication path. According to one embodiment, the communication path may be a wireless communication path.

Any one of the above embodiments can prevent a third party from fraudulently reprogramming the ECU.

DESCRIPTION OF SPECIFIC EMBODIMENTS

The present inventions will be described more fully hereinafter with reference to the accompanying drawings. Like numbers refer to like elements throughout.

(First Embodiment)
(Hardware Configuration)

Figure 1:
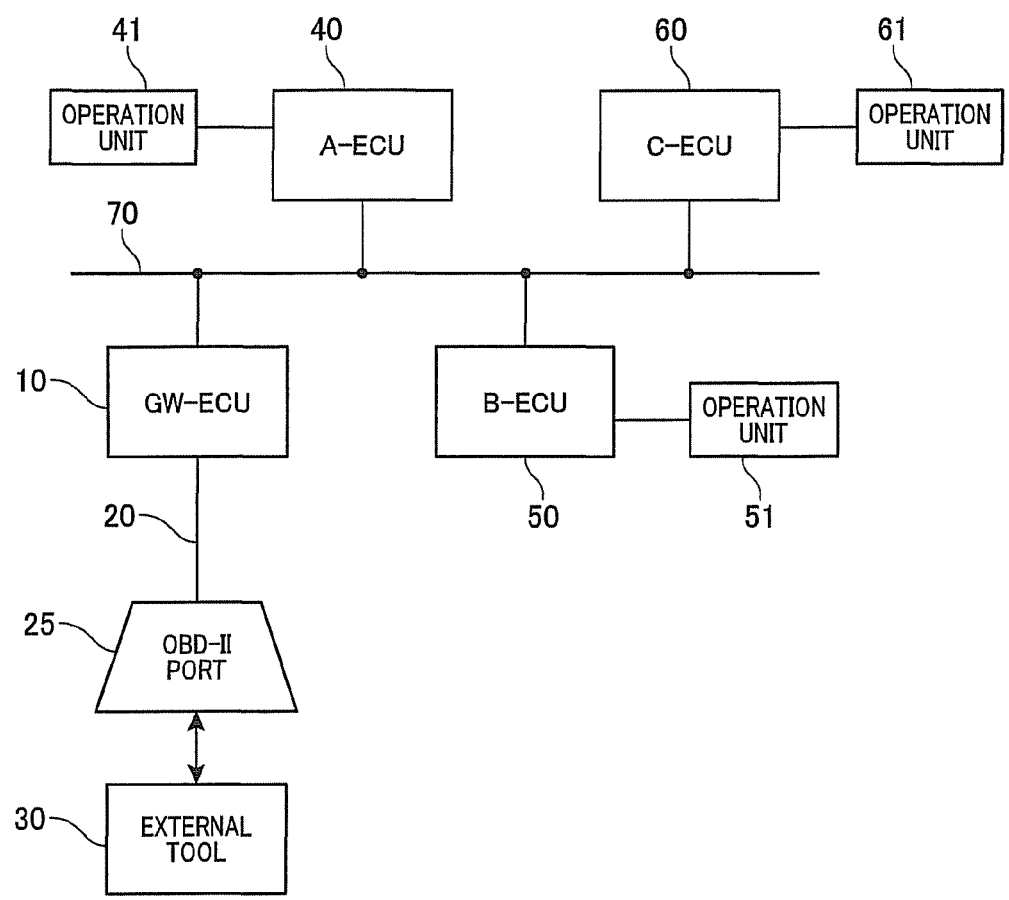
FIG. 1 shows a schematic block diagram of a communications relay system including a GW ECU and an external tool in accordance with a first embodiment of the present invention.

There will now be explained a gateway electronic control unit (GW ECU) 10 in accordance with a first embodiment of the present invention. As shown in FIG. 1, the GW ECU 10 is connected to one or more ECUs (e.g., A-ECU 40, B-ECU 50, and C-ECU 60) via an in-vehicle local area network (LAN) 70 and to an external tool 30 via a communication path 20 to relay communications between the ECUs connected to the in-vehicle LAN 70 and the external tool 30.

The in-vehicle LAN 70 and the communication path 20 are in compliance with the same communication standard, such as the CAN standard. The external tool 30 may be connected to the communication path 20 via a well-known On-Board Diagnostics II (OBD-II) port 25, when needed, and may communicate with the A-ECU 40, the B-ECU 50, and the C-ECU 60 via the GW ECU 10 to test or reprogram them.

Each of the A-ECU 40, the B-ECU 50, and the C-ECU 60 is adapted to detect the operation performed on a respectively corresponding one of operation units 41 to 61 (which will be described in detail later), such as a door handle, a window-opening/closing switch and the like that are mounted on a vehicle.

Figure 2A:
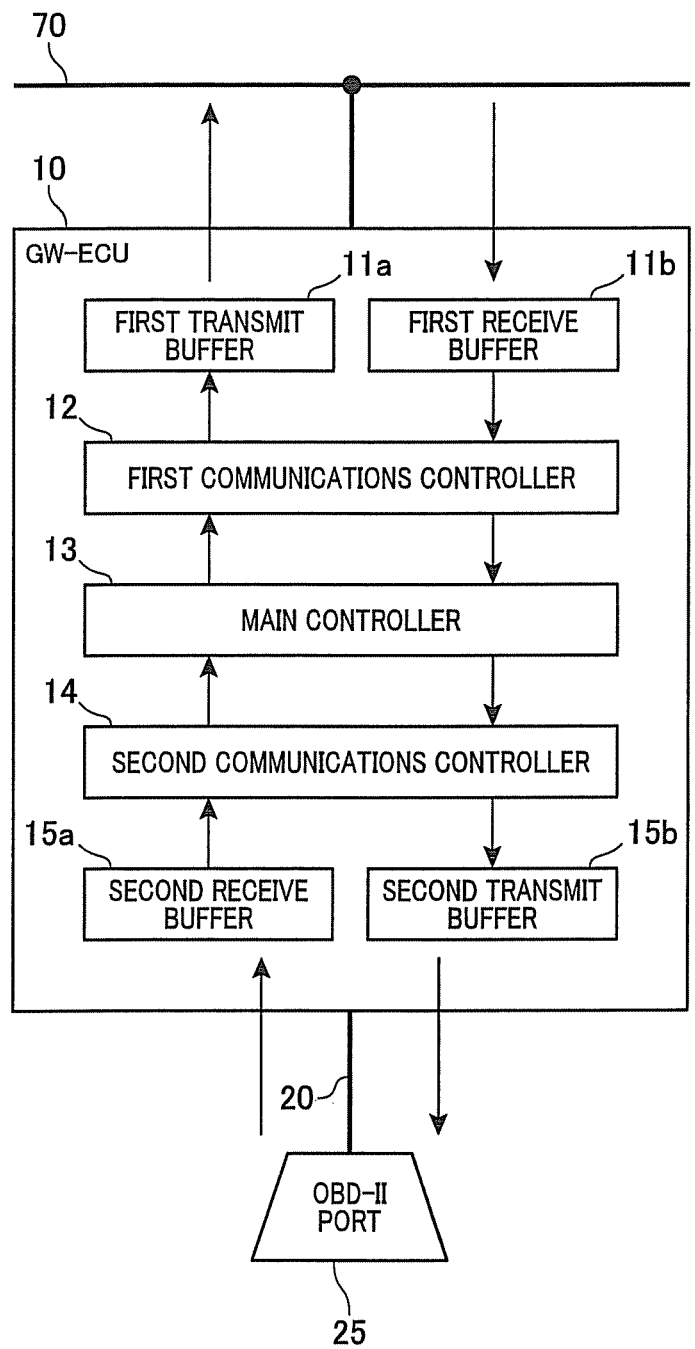
FIG. 2A shows a schematic block diagram of the GW ECU.

As shown in FIG. 2A, the GW ECU 10 includes a well-known microcomputer formed of CPU (not shown), ROM (not shown), RAM (not shown), input/output ports (not shown), and a bus line (not shown) connecting them. The GW ECU 10 further includes a main controller 13 effecting overall control of the GW ECU 10 according to programs stored in the ROM or the like, a first transmit buffer 11a, a first receive buffer 11b and a first communications controller 12 for communicating with the other ECUs (the A-ECU 40, the B-ECU 50, and the C-ECU 60) via the in-vehicle LAN 70, and a second receive buffer 15a, a second transmit buffer 15b and a second communications controller 14 for communicating with the external tool 30 via the communication path 20.

(Operations)

There will now be explained the operation of the GW ECU 10 of the first embodiment.

As described above, the GW ECU 10 is adapted to relay communications between the external tool 30 connected to the On-Board Diagnostics II (OBD-II) port 25 and the other ECUs connected to the in-vehicle LAN 70, where the in-vehicle LAN 70 and the communication path 20 are both in compliance with the CAN standard (which may, in some other embodiments, be replaced with a different kind of communication standard). The GW ECU 10 is further adapted to forward pre-registered frames of the frames submitted by the other ECUs to the in-vehicle LAN 70 to the communication path 20 and forward pre-registered frames of the frames submitted by the external tool 30 to the communication path 20 to the in-vehicle LAN 70.

In the present embodiment, however, the GW ECU 10 is inhibited from relaying reprogramming frames each for reprogramming one of the other ECUs submitted by the external tool 30 to the communication path 20, where each reprogramming frame is one kind of pre-registered frame. Relay of the reprogramming frames is permitted only when a vehicle user is successfully authenticated by a sequence of operations performed on a predetermined set of operation units 41, 51, 61 mounted on his/her own vehicle. That is, each of the pre-registered frames is initially a relay-inhibited frame or a relay-permitted frame, and the relay-inhibited frame may change to a relay-permitted frame upon the successful authentication.

Each of the pre-registered frames other than the reprogramming frames is referred to as a basic relay frame. In some embodiments, only the reprogramming frames may be pre-registered in the GW ECU 10 so that the GW ECU 10 can relay only the reprogramming frames after the successful authentication.

Each of the operation units 41, 51, 61 may be anything that is capable of detecting an operation performed thereon through frames submitted by the other ECUs to the in-vehicle LAN 70. More specifically, for example, the predetermined set of operation units 41, 51, 61 may be selected from a group of door handles disposed on interior portions (i.e., inner door handles) of respective doors of the vehicle, door handles disposed on exterior portions (i.e., outer door handles) of respective doors of the vehicle, a door-window opening/closing switch, a steering wheel, an accelerator pedal, a brake pedal, an operational button for vehicle equipment (such as a car air-conditioner, a navigation device or the like). The predetermined set of operation units 41, 51, 61 may also include a touch-sensitive switch for detecting a user's hand has touched a door handle, which is used to unlock a door of a vehicle equipped with a keyless authorization system (known as a "smart entry system"), and/or a door lock switch used to unlock a vehicle door without a key.

Figure 2B:
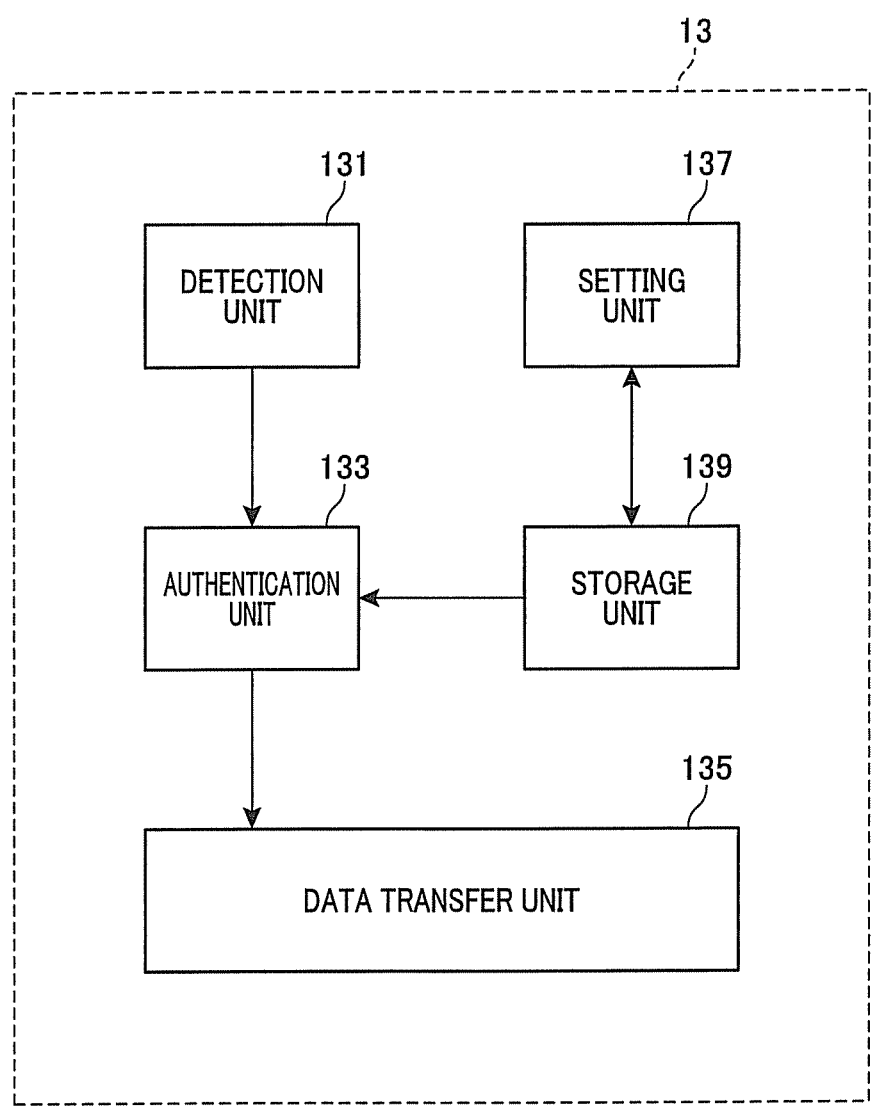
FIG. 2B shows a schematic block diagram of a main controller of the GW ECU.

Referring to FIG. 2B, the main controller 13 includes a detection unit 131 (as detection means), an authentication unit 133 (as authentication means), and a data transfer unit 135 (data transfer means), a setting unit 137 (as setting means), and a storage unit 139 (as storage means) for storing an authentication procedure.

The detection unit 131 detects a sequence of operations performed on the predetermined set of operation units 41, 51, 61 from frames received from the A-ECU 40, the B-ECU 50, and the C-ECU 60 via the in-vehicle LAN 70.

The authentication unit 133 determines whether or not the sequence of operations detected by the detection unit 131 are consistent with the authentication procedure set and stored in the storage unit 139, and only when it is determined that the detected sequence of operations are consistent with the authentication procedure, then permits the data transfer unit 135 to forward the pre-registered frames (including the reprogramming frames) received from the external tool 30. That is, the authentication unit 133 remains inhibited from forwarding the reprogramming frames received from the external tool 30 unless the detected sequence of operations are consistent with the authentication procedure.

The data transfer unit 135 is inhibited from forwarding the reprogramming frames received from the external tool 30 and only allowed to forward the pre-registered frames other than the reprogramming frames received from the external tool 30 unless the sequence of operations detected by the detection unit 131 are consistent with the authentication procedure. The data transfer unit 135 is permitted to forward the reprogramming frames received from the external tool 30 only when it is determined by the authentication unit 133 that the detected sequence of operations are consistent with the authentication procedure.

The setting unit 137 determines whether or not an authentication procedure for permitting relay of the reprogramming frames received from the external tool 30 is set in the storage unit 139, and when it is determined that no authentication procedure is set in the storage unit 139, then sets up an authentication procedure on the basis of data stored in the ROM or the like. The setting unit 137 may update the authentication procedure in response to a user's instruction. In some embodiments, the RAM or the like in the GW ECU 10 may serve as the storage unit 139.

Figure 3:
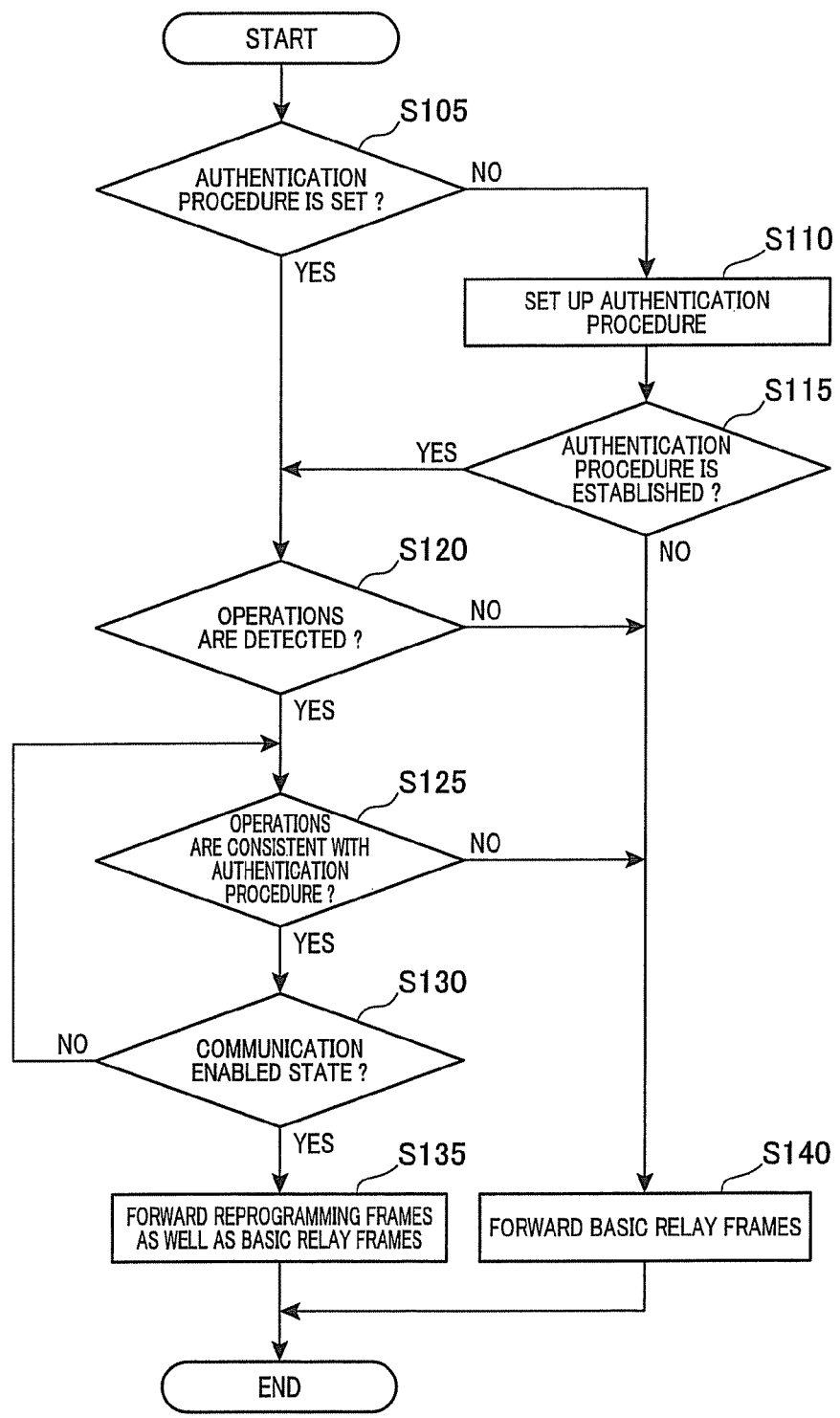
FIG. 3 shows a flowchart for a communications relay process performed in the GW ECU.

A communications relay process performed in the GW ECU 10 will now be explained with reference to a flowchart shown in FIG. 3, in which the GW ECU 10 authenticates a vehicle user by using a sequence of operations performed on the predetermined set of operation units of the vehicle, and when the user is successfully authenticated, then permits relay of the reprogramming frames submitted by the external tool 30 to forward the reprogramming frames to the in-vehicle LAN 70.

In step S105, the main controller 13 of the GW ECU 10 determines whether or not an authentication procedure (operation procedure) for permitting relay of the reprogramming frames submitted by the external tool 30 is set in the main controller 13. If it is determined in step S105 that the authentication procedure is set, then the process proceeds to step S120. If it is determined in step S105 that the authentication procedure is not set yet, then the process proceeds to step S110.

In step S110, the main controller 13 sets up an authentication procedure on the basis of data stored in the ROM or the like. Thereafter, the process proceeds to the step S115.

As an example, the authentication procedure may be given by the following sequence of operations including: a driver operating an outer door-handle for a driver seat once, the driver operating a door lock switch near the driver seat twice, and then the driver or another passenger operating an outer door-handle for a front passenger seat once. A different sequence of operations performed on a door-window opening/closing switch, a steering wheel, a specific operational button for a car air-conditioner or the like, and other operation units may also be used for the authentication procedure. The authentication procedure may be updated in response to a user's instruction.

Subsequently, in step S115, the main controller 13 determines whether or not an authentication procedure has been set up or established. If it is determined in step S115 that an authentication procedure has been set up, then the process proceeds to step S120. If it is determined in step S115 that an authentication procedure has not been set up yet, then the process proceeds to the step S140.

In step S120, the main controller 13 detects a sequence of operations performed on the set of operation units 41, 51, 61 on the basis of frames received from the A-ECU 40, the B-ECU 50, and the C-ECU 60 via the in-vehicle LAN 70. If a sequence of operations are detected, then the process proceeds to the step S125. If no operations are detected, then the process proceeds to the step S140.

In step S125, the main controller 13 determines whether or not the detected sequence of operations are consistent with the authentication procedure. If it is determined in step S125 that the detected sequence of operations are consistent with the authentication procedure, then the main controller 13 permits relay of the reprogramming frames submitted by the external tool 30. Thereafter, the process proceeds to step S130. If it is determined in step S125 that the detected sequence of operations are not consistent with the authentication procedure, then the process proceeds to step S140.

In step S130, the main controller 13 determines whether or not the GW ECU 10 is in a communication enabled state, i.e., whether or not the GW ECU 10 has transitioned from a communication disabled sate to a communication enabled state. If it is determined in step S130 that the GW ECU 10 is in the communication enabled state, then the process proceeds to step S135. If it is determined in step S130 that the GW ECU 10 is in the communication disabled state, then the process returns to step S125. In the present embodiment, the GW ECU 10 transitions from the communication disabled state to the communication enabled state according to the overall decision made from joint consideration of a state of power supply to each of the other ECUs, a drive condition for a communication bus, and a drive condition for each frame and the like.

In step S135, the main controller 13 forwards the reprogramming frames as well as the basic relay frames submitted by the external tool 30 to the communication path 20 to the in-vehicle LAN 70 and forwards the basic relay frames submitted by the other ECUs to the in-vehicle LAN 70 to the communication path 20.

Hence, when the reprogramming frames for reprogramming one of the other ECUs are submitted by the external tool 30, communications between the external tool 30 and the one of the other ECUs will be established. The one of the ECUs will thus be reprogrammed.

On the other hand, in step S140, the main controller 13 forwards the basic relay frames (the pre-registered frames other than the reprogramming frames) submitted by the external tool 30 to the communication path 20 to the in-vehicle LAN 70 and forwards the basic relay frames submitted by the other ECUs to the in-vehicle LAN 70 to the communication path 20.

Hence, even when the reprogramming frames for reprogramming one of the other ECUs are submitted by the external tool 30, no communications between the external tool 30 and the one of the other ECUs will be established. The one of the other ECUs will not be reprogrammed.

(Benefits)

In the GW ECU 10 of the first embodiment, only when a sequence of operations performed on the predetermined set of operation units of the vehicle (e.g., door handles) are consistent with the authentication procedure, the external tool 30 is allowed to reprogram the other ECUs. This can prevent a third party from fraudulently reprogramming the other ECUs.

(Second Embodiment)

There will now be explained a second embodiment of the present invention. A data communication module (DCM) used for accessing the Internet via wireless communications to be served with various services is known. In the second embodiment, the DCM 80 communicates wirelessly with an external server 90 to remotely test or reprogram the other ECUs connected to an in-vehicle LAN 70. Only differences of the second embodiment from the first embodiment will be explained.

(Hardware Configuration)

Figure 4A:
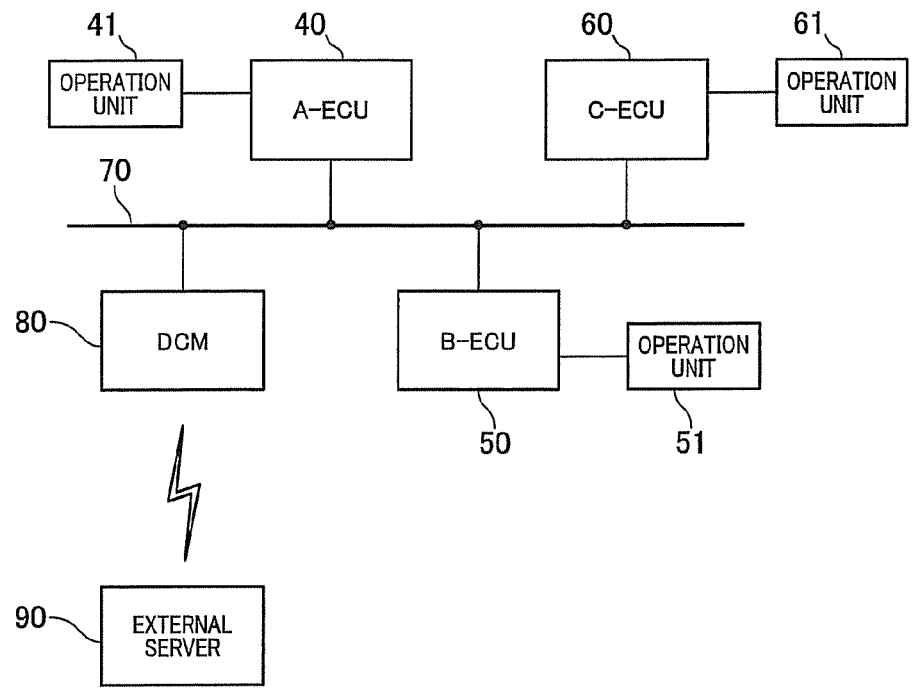
FIG. 4A shows a schematic block diagram of a communications relay system including a DCM and an external server in accordance with a second embodiment of the present invention.

As shown in FIG. 4A, the DCM 80 is connected to one or more ECUs (e.g., A-ECU 40, B-ECU 50, and C-ECU 60) via the in-vehicle LAN 70, as in the first embodiment. The DCM 80 is wirelessly communicable with the external server 90 over the Internet. The external server 90 communicates with the ECUs (A-ECU 40, B-ECU 50, and C-ECU 60) via the DCM 80 to remotely test or reprogram them.

Figure 4B:
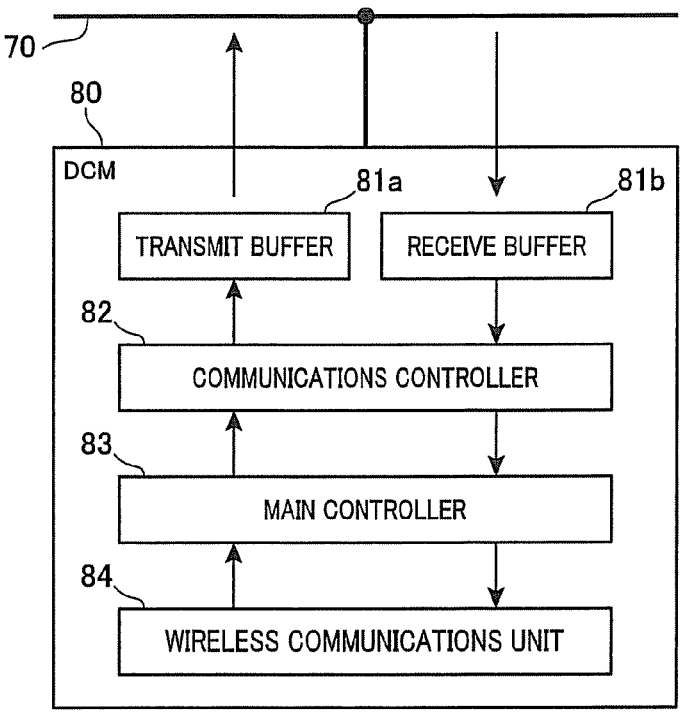
FIG. 4B shows a schematic block diagram of the DCM.

As shown in FIG. 4B, the DCM 80 includes a well-known microcomputer formed of CPU (not shown), ROM (not shown), RAM (not shown), input/output (I/O) ports (not shown), a bus line (not shown) connecting them. The DCM 80 further includes a main controller 83 effecting overall control of the DCM 80 according to programs stored in the ROM or the like, a transmit buffer 81a for communicating with the other ECUs via the in-vehicle LAN 70, a receive buffer 81b, a communications controller 82, and a wireless communications unit 84 for accessing the Internet via wireless communications to communicate with the external server 90.

(Operations)

There will now be explained the operation of the DCM 80 of the second embodiment.

The DCM 80 is adapted to convert pre-registered frames of the frames received from the other ECUs (A-ECU 40, B-ECU 50, and C-ECU 60) via the in-vehicle LAN 70 and forward the converted frames to the external server 90 and further adapted to convert pre-registered frames of the frames received from the external server 90 and forward the converted frames to the in-vehicle LAN 70. This allows each of the other ECUs to access the external server 90 via the DCM 80 and thus allows the driver or the other passengers to be served with various services via the Internet.

In the present embodiment, the external server 90 may be a testing server or a reprogramming server. The testing server communicates with the other ECUs via the DCM 80 to test them. The reprogramming server communicates with the ECUs via the DCM 80 to reprogram them.

However, as in the first embodiment, the DCM 80 is inhibited from relaying the reprogramming frames received from the external server 90. The relay of reprogramming frames is permitted only when a vehicle user is successfully authenticated by a sequence of operations performed on the set of operation units 41, 51, 61 mounted on his/her own vehicle.

Figure 4C:
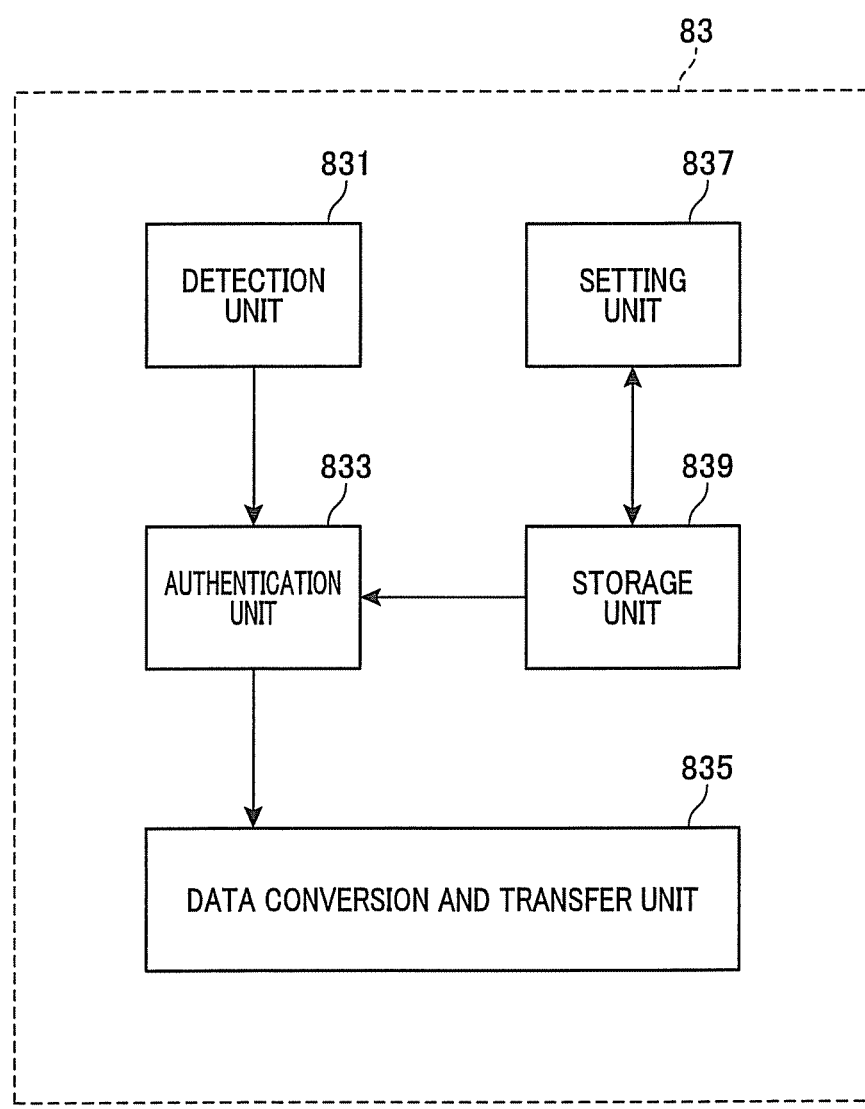
FIG. 4C shows a schematic block diagram of a main controller of the DCM.

Similarly to the main controller 13 of the GW ECU 10, as shown in FIG. 4C, the main controller 83 of the DCM 80 includes a detection unit 831 (as detection means), an authentication unit 833 (as authentication means), and a data conversion and transfer unit 835 (data conversion and transfer means), a setting unit 837 (as setting means), and a storage unit 839 (as storage means) for storing an authentication procedure.

The detection unit 831 detects a sequence of operations performed on the predetermined set of operation units 41, 51, 61 from frames received from the A-ECU 40, the B-ECU 50, and the C-ECU 60 via the in-vehicle LAN 70.

The authentication unit 833 determines whether or not the sequence of operations detected by the detection unit 831 are consistent with the authentication procedure set and stored in the storage unit 839, and only when it is determined that the detected sequence of operations are consistent with the authentication procedure, then permits the data conversion and transfer unit 835 to forward the pre-registered frames (including the reprogramming frames) received from the external server 90. That is, the authentication unit 833 remains inhibited from forwarding the reprogramming frames received from the external server 90 unless the detected sequence of operations are consistent with the authentication procedure.

The data conversion and transfer unit 835 is inhibited from converting and forwarding the reprogramming frames received from the external server 90 and only allowed to convert and forward the pre-registered frames other than the reprogramming frames (i.e., the basic relay frames) received from the external, server 90 unless the sequence of operations detected by the detection unit 831 are consistent with the authentication procedure. The data conversion and transfer unit 835 is permitted to convert and forward the reprogramming frames received from the external server 90 only when it is determined by the authentication unit 833 that the detected sequence of operations are consistent with the authentication procedure.

The setting unit 837 determines whether or not an authentication procedure for permitting relay of the reprogramming frames received from the external server 90 is set in the storage unit 839, and when it is determined that no authentication procedure is set in the storage unit 839, then sets up an authentication procedure on the basis of data stored in the ROM or the like. The setting unit 837 may update the authentication procedure in response to a user's instruction. In some embodiments, the RAM or the like in the DCM 80 may serve as the storage unit 839.

As in the first embodiment, each of the pre-registered frames other than the reprogramming frames is referred to as a basic relay frame. In some embodiments, only the reprogramming frames may be pre-registered in the DCM 80 so that the DCM 80 can relay only the reprogramming frames after the successful authentication.

Authentication for such remote reprogramming is performed in a similar manner to the above described communications relay process of the first embodiment. The communications relay process performed in the DCM 80 in accordance with the second embodiment will also be explained with reference to the same flowchart shown in FIG. 3. Only differences of the second embodiment from the first embodiment will be explained.

In steps S105 to S130, similar operations to those of the first embodiment are performed in the main controller 83 of the DCM 80.

Thereafter, in step S135, the main controller 83 converts pre-registered frames received from the external server 90, each of which is a basic relay frame or a reprogramming frame, into frames having a format for the in-vehicle LAN 70 and forwards the converted frames to the in-vehicle LAN 70. In addition, the main controller 83 converts pre-registered frames of the frames submitted by the other ECUs to the in-vehicle LAN 70 into frames having a format for wireless communications and forwards the converted frames to the external server 90 via the Internet.

Hence, even when the reprogramming frames for reprogramming one of the ECUs are submitted by the reprogramming server (when the external server 90 is the reprogramming server), communications between the reprogramming server and the one of the ECUs will be established. The one of the ECUs will thus be reprogrammed.

On the other hand, in step S140, the main controller 83 converts only basic relay frames of the frames received from the external server 90 into frames having a format for the in-vehicle LAN 70 and forwards the converted frames to the in-vehicle LAN 70. In addition, the main controller 83 converts only basic relay frames of the frames submitted by the other ECUs to the in-vehicle LAN 70 into frames having a format for wireless communications and forwards the converted frame to the external server 90 via the Internet.

Hence, even when the reprogramming frames for reprogramming one of the other ECUs are submitted by the reprogramming server (when the external server 90 is the reprogramming server), no communications between the reprogramming server and the one of the other ECUs will be established. The one of the ECUs will not be reprogrammed.

(Benefits)

In the DCM 80 of the second embodiment, as in the first embodiment, only when a sequence of operations performed on the predetermined set of operation units of the vehicle are consistent with the authentication procedure, the reprogramming server as the external server 90 is allowed to reprogram the other ECUs. This can prevent a third party from fraudulently reprogramming the other ECUs.

(Some Modifications)

There will now be explained some modifications of the first and second embodiments that may be devised without departing from the spirit and scope of the present invention.

(i) In the communications relay process of the first/second embodiment, the GW ECU 10/DCM 80 first authenticates a vehicle user by using a sequence of operations performed on a predetermined set of operation units, such as door handles, of his/her own vehicle. Alternatively, the GW ECU 10/DCM 80 may authenticate the vehicle user after receiving the reprogramming frames from the external tool 30/reprogramming server.

That is, the GW ECU 10/DCM 80 may temporarily store therein reprogramming frames received from the external tool 30/reprogramming server and authenticate a vehicle user by using a sequence of operations performed on the predetermined set of operation units of his/her own vehicle. The GW ECU 10/DCM 80 may be permitted to forward the stored reprogramming frames to the in-vehicle LAN 70 in the order they are received only when the vehicle user is successfully authenticated with the sequence of operations performed on the set of operation units of his/her own vehicle.

Also in such an alternative embodiment, only when a sequence of operations performed on the predetermined set of operation units are consistent with the authentication procedure, the external tool 30/reprogramming server is allowed or permitted to reprogram the other ECUs. This leads to similar benefits to those in the first and second embodiments.

(ii) In the first/second embodiment, the GW ECU 10/DCM 80 detects a sequence of operations performed on the predetermined set of operation units from data received via the in-vehicle LAN 70. Alternatively, the GW ECU 10/DCM 80 may detect a sequence of operations performed on the predetermined set of operation units from data received via a different communication path or from data received from sensors capable of detecting operations performed on the respective operation units. This also leads to similar benefits to those in the first and second embodiments.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A communications relay apparatus for relaying communications between an electronic control unit (ECU) connected to the apparatus via an in-vehicle local area network (LAN) and an external device connected to the apparatus via a communication path different from the in-vehicle LAN, the communications relay apparatus comprising:
   one or more processors; and
   an electronic controller including:
      a data transfer unit that forwards relay data received from the ECU to the communication path and forwards relay data received from the external device to the in-vehicle LAN, the data transfer unit being inhibited from forwarding reprogramming data for reprogramming the ECU received from the external device to the in-vehicle LAN;
      a detection unit that detects a sequence of operations performed on a predetermined set of operation units of a vehicle by a vehicle user; and
      an authentication unit that authenticates the vehicle user by determining whether or not the sequence of operations detected by the detection unit are consistent with a predetermined authentication procedure, and when it is determined that the sequence of operations detected by the detection unit are consistent with the predetermined authentication procedure, the vehicle user is successfully authenticated and the electronic controller permits the data transfer unit to forward the reprogramming data to the in-vehicle LAN, wherein the sequence of operations performed on the predetermined set of operation units of the vehicle include an operation of at least one of a door handle, a window switch, a steering wheel, an acceleration pedal and a brake pedal, an operational button for vehicle-mounted equipment and a door lock switch, and are programmable and are programmed by instructions from the vehicle user.

2. The apparatus of claim 1, wherein the data transfer unit is adapted to forward only basic relay data that is pre-registered relay data received from the external device other than the reprogramming data to the in-vehicle LAN, regardless of whether or not the vehicle user is successfully authenticated.

3. The apparatus of claim 1, wherein the detection unit detects the sequence of operations performed on the predetermined set of operation units on the basis of data received from the ECU via the in-vehicle LAN.

4. The apparatus of claim 1, further comprising a storage unit for storing an authentication procedure for permitting relay of the reprogramming data received from the external device, and the authentication unit determines whether or not the detected sequence of operations are consistent with the authentication procedure previously stored in the storage unit as the predetermined authentication procedure.

5. The apparatus of claim 4, further comprising a setting unit that determines whether or not the predetermined authentication procedure is stored in the storage unit, and when it is determined that no authentication procedure is stored in the storage unit, the setting unit sets up and stores in the storage unit an authentication procedure as the predetermined authentication procedure.

6. The apparatus of claim 1, wherein the predetermined set of operation units are selected from a group of outer and inner door handles of respective doors of the vehicle, a door-window opening or closing switch, a steering wheel, an accelerator pedal, a brake pedal, an operational button for vehicle equipment, a touch-sensitive switch for detecting a user's hand has touched a door handle, and a door lock switch used to unlock a vehicle door without a key.

7. The apparatus of claim 1, wherein the communication path comprises a wired communication path.

8. The apparatus of claim 1, wherein the communication path comprises a wireless communication path.

9. The apparatus of claim 1, wherein the sequence of operations performed on the predetermined set of operation units of the vehicle include an operation of at least one of an inner door handle, an outer door handle, a window switch, a steering wheel, an acceleration pedal and a brake pedal.

10. The apparatus of claim 1, wherein at least one of the predetermined set of operation units of the vehicle is disposed within a passenger compartment of the vehicle at a position accessible from a driver's seat of the vehicle.

11. The apparatus of claim 1, wherein the sequence of operations or the predetermined set of operation units is known by the vehicle user.

12. The apparatus of claim 1, wherein the user who does not know the sequence of operations or the predetermined set of operation units is not authenticated by the authentication unit.

13. The apparatus of claim 1, wherein the vehicle user authenticated by the authentication unit is required to physically perform each of the sequence of operations.

14. The apparatus of claim 1, wherein the authentication unit only authenticates an authorized vehicle user.

15. A communications relay apparatus for relaying communications between an electronic control unit (ECU) connected to the apparatus via an in-vehicle local area network (LAN) and an external device connected to the apparatus via a communication path different from the in-vehicle LAN, the communications relay apparatus comprising:

one or more processors; and an electronic controller including:

a data transfer unit that forwards relay data received from the ECU to the communication path and forwards relay data received from the external device to the in-vehicle LAN, the data transfer unit being inhibited from forwarding reprogramming data for reprogramming the ECU received from the external device to the in-vehicle LAN;

a detection unit that detects a sequence of operations performed on a predetermined set of operation units of a vehicle by a vehicle user; and an authentication unit that authenticates the vehicle user by determining whether or not the sequence of operations detected by the detection unit are consistent with a predetermined authentication procedure, and when it is determined that the sequence of operations detected by the detection unit are consistent with the predetermined authentication procedure, the vehicle user is successfully authenticated and the electronic controller permits the data transfer unit to forward the reprogramming data to the in-vehicle LAN, wherein the sequence of operations performed on the predetermined set of operation units of the vehicle include an operation of at least one of a door handle, a window switch, a steering wheel, an acceleration pedal and a brake pedal, an operational button for vehicle-mounted equipment and a door lock switch.

\* \* \* \* \*